United States Patent
Peake et al.

[11] 3,881,240
[45] May 6, 1975

[54] METHOD FOR INSTALLING A TUBE CLAMP

[75] Inventors: Charles C. Peake; Harry H. Bolan, both of Media, Pa.

[73] Assignee: Westinghouse Electric Corporation, Pittsburgh, Pa.

[22] Filed: Nov. 12, 1973

[21] Appl. No.: 415,281

Related U.S. Application Data

[62] Division of Ser. No. 306,132, Nov. 13, 1972, Pat. No. 3,813,749.

[52] U.S. Cl. .................... 29/468; 29/200 P; 29/464
[51] Int. Cl. ............................................. B23q 3/00
[58] Field of Search ........... 248/49 R, 68 R; 269/43; 29/202 R, 200 J, 400 R, 150, 200 P, 157.3 R, 468, 464, 466, 467

[56] References Cited
UNITED STATES PATENTS

| | | | |
|---|---|---|---|
| 2,381,584 | 8/1945 | Fulleton | 269/43 |
| 2,693,940 | 11/1954 | Preisinger | 248/68 R |
| 2,805,277 | 9/1957 | Moeller | 248/49 |
| 3,180,597 | 4/1965 | Havener | 248/68 R |
| 3,181,484 | 5/1965 | Keppler | 248/68 R |

Primary Examiner—C. W. Lanham
Assistant Examiner—James R. Duzan
Attorney, Agent, or Firm—F. J. Baehr, Jr.

[57] ABSTRACT

A method for installing an elongated strip of stainless steel having a plurality of equally spaced oblong holes transversely disposed therein is bent along its longitudinal axis to have a V-shaped cross section, whereby the oblong openings form kerfs, which register with and accept a tube, wherein margins of the strip are compressed to fit into a tool formed from a flat bar having the edges bent 115 so that they turn inwardly and engage the margins of the strip. The kerfs are placed over the tubes to be clamped and a pin is inserted between the tube and the bent portion of the strip, then the tool is slid from the strip allowing the margins to spring outwardly and securely clamp the tubes against the pin.

2 Claims, 6 Drawing Figures

3,881,240

METHOD FOR INSTALLING A TUBE CLAMP

This is a division, of application Ser. No. 306,132 filed Nov. 13, 1972, now U.S. Pat. No. 3,813,749.

BACKGROUND OF THE INVENTION

This invention relates to tube clamps and more particularly to a tube clamp which can be easily installed in a heat exchanger after the heat exchanger has been completely assembled.

Tubes in central station steam surface condenses have failed because of flow induced vibration. The high velocity steam passing over the outer surface of the tubes has caused the tubes to vibrate to such an extent that an area adjacent the mid portion of the span between supports come into contact and wears a hole in the tube or the vibrations cause failure of the tube adjacent the supports as a result of stress fatigue.

Installing additional support members between the existing supports has eliminated this problem. The intermediate supports have been made from sheets of Micarta drilled to the tube pattern and then cut along the centers of the holes to form strips, which were then inserted into the tube bundle to form a complete support plate. While this procedure was successful in eliminating the failures noted above, it was very expensive.

Another solution consists of lacing strips of Neoprene between adjacent rows of tubes. This reduced the vibration, however, the high velocity steam, which contains water droplets, soon eroded the Neoprene strips. Therefore, an erosion resistant inexpensive clamp was needed.

SUMMARY OF THE INVENTION

In general, a method for installing a tube clamp formed from an elongated strip having generally parallel side margins and a plurality of transversely disposed elongated openings disposed therein to form kerfs when the strip is bent generally parallel to its longitudinal axis utilizing a pin and a tool formed from a flat bar which has its edges folded at an angle in excess of 90°, when practiced in accordance with this invention, the method comprises the steps of compressing the margins of the strip to fit within the folded edge of the tool, placing the kerfs over the tubes, inserting the pin between the tubes and the bent portion of the strip to capture the tubes within the kerfs, and sliding the tool from the strip, whereby the margins of the strip spring outwardly tightly clamping the tubes against the pin.

BRIEF DESCRIPTION OF THE DRAWINGS

The objects and advantages of this invention will become more apparent from reading the following detailed description in connection with the accompanying drawings in which corresponding reference characters indicate corresponding portions throughout the drawings and in which.

DESCRIPTION OF THE PREFERRED EMBODIMENT

Figure 1:
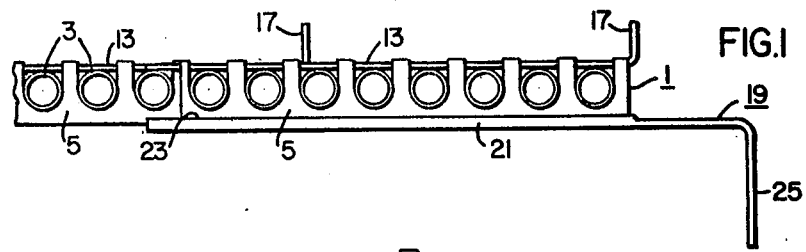
FIG. 1 is a partial sectional view of a row of tubes held together by clamps made in accordance with this invention.
Figure 2:
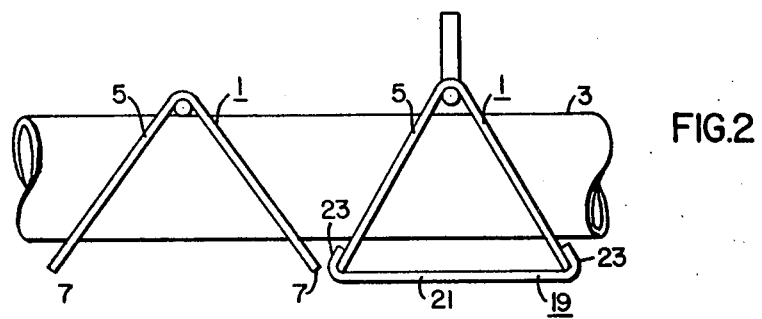
FIG. 2 is a partial sectional view taken on line II—II of FIG. 1.

Referring now to the drawings in detail, FIGS. 1 and 2 show clamps 1 installed on a row of tubes to lock or clamp the tubes together to prevent vibration caused failures. The clamps are particularly adapted to be installed on a row of tubes in an assembled heat exchanger.

Figure 3:
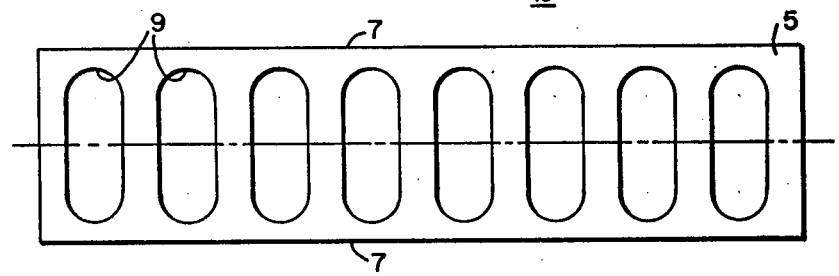
FIG. 3 is a partial plan view of an unfolded strip utilized to form the clamp.

As shown in FIG. 3, the clamp 1 comprises an elongated strip 5 of stainless steel or other springy material having parallel side margins 7 and a plurality of elongated, oblong holes or openings 9 transversely disposed therein. The openings 9 are generally equally spaced and are disposed on the same pitch as the tubes 3.

Figure 4:
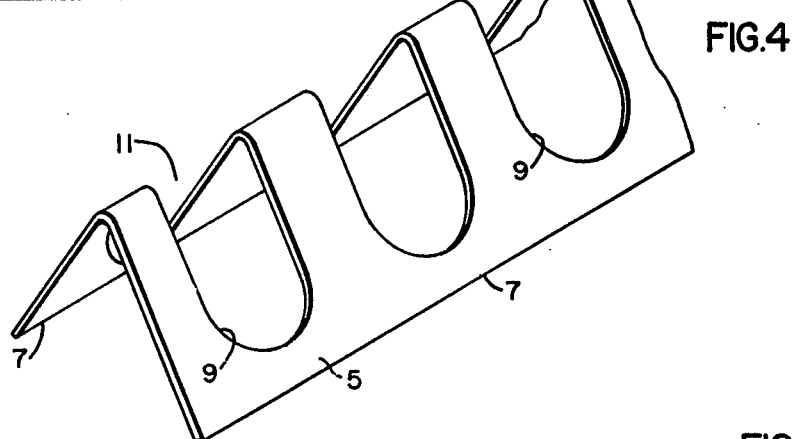
FIG. 4 is an isometric view of a folded strip.
Figure 6:
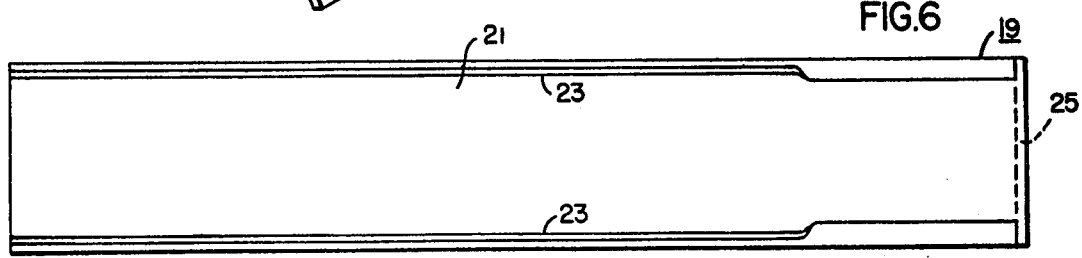
FIG. 6 is a plan view of a tool utilized to install the clamps.

As shown in FIG. 4, the strip is bent adjacent and parallel to its longitudinal axis to generally have a V-shaped cross section, which preferably forms a 60° angle. When the strip is so bent, the elongated openings 9 are disposed to form kerfs 11, which register with the tubes 3 and are sufficiently deep to accept a tube.

Figure 5:
FIG. 5 is a plan view of a pin utilized to form the clip.

An elongated pin or bar 13 is slidably disposed between the tubes 3 and the bent portion of the strip 5 to capture the tube within the kerfs 11. As shown in FIG. 5, the one end of the pin 15 is rounded while the other end 17 is bent 90°, the rounded end and 90° bend cooperate to assist in inserting the pin between the tubes and the bent portion of the strip 5.

As shown in FIG. 1, a tool 19 is utilized to install the clamp 1. The tool 19 is formed from a flat bar or strip 21 of steel or other material by bending or breaking the longitudinal edges or margins 23 in excess of 90° preferably approximately 115° to 120°. One end 25 of the bar 21 is bent to form a handle.

To install the strip 5 compressive forces are applied to the margins 7 to move them inwardly. The margins 7 are then slid into the tool and fit within the turned up edges 23 as shown in FIG. 2. The kerfs 11 are placed over the tubes 3 and the pin 13 is inserted between the tube 3 and the bent portion of the strip 5. With margins 7 of the strip 5 pressed inwardly there is clearance between the pin 13 and tubes, allowing the pin to slide easily into place. Once the pin is in place, the tool 19 is slid from the margin 7 of the strip 5 and the margins spring outwardly securely clamping the pin 13 and tubes 3.

The strip 5 may be any length, however, extremely long lengths become cumbersome and difficult to handle, therefore, as shown in FIG. 1, to clamp long rows of tubes, a plurality of short strips 5 are utilized and adjacent strips are disposed to clamp one or more tubes also clamped within a kerf 11 of an adjacent strip.

The clamps 1 and method of installing them are advantageously readily adapted to accommodate a row of tubes having any number of tubes disposed therein. The clamps are also easily installed in an assembled heat exchanger, are economical to produce, and can be economically formed from materials which are erosion resistant.

What is claimed is:

1. A method for installing a tube clamp formed from an elongated strip having generally parallel side margins and a plurality of transversely disposed elongated openings disposed therein to form kerfs when the strip is bent generally parallel to its longitudinal axis utilizing a straight pin and a tool formed from a flat bar which has its edges folded at an angle in excess of 90°, said method comprising the steps of:
- compressing the margins of the strip to fit within the folded edges of the tool,
- placing the kerfs over the tubes,
- inserting the straight pin between the tubes and the bent portion of the strip to capture the tubes within the kerfs, and
- sliding the tool from the strip, whereby the margins of the strip spring outwardly tightly clamping the tubes against the pin.

2. A method as set forth in claim 1 and further comprising the steps of:
- compressing the margins of a second strip to fit within the folded edges of the tool,
- placing the second strip and tool so that at least one kerf overlaps a tube overlapped by a kerf in the first-mentioned strip and the remaining kerfs overlap other tubes,
- inserting a second straight pin between the tubes and the bent portion of the second-mentioned strip to capture the tubes within the kerfs, and
- removing the tool wherein the margins of the second strip spring outwardly to tightly clamp the tubes against the second pin.

* * * * *